United States Patent [19]

Englander et al.

[11] 4,040,898

[45] Aug. 9, 1977

[54] EVAPORATING APPARATUS AND PROCESS

[75] Inventors: Harlan P. Englander, Tonawanda; Edward B. Pinkel, Buffalo, both of N.Y.

[73] Assignee: Blaw-Knox Food and Chemical Equipment, Inc., Buffalo, N.Y.

[21] Appl. No.: 655,221

[22] Filed: Feb. 4, 1976

Related U.S. Application Data

[63] Continuation of Ser. No. 254,427, May 18, 1972, abandoned.

[51] Int. Cl.² .................................... B01D 1/06
[52] U.S. Cl. ........................ 159/27 R; 159/47 R
[58] Field of Search ............... 159/13 R, 13 A, 27 R, 159/27 A, 27 B, 14, 49

[56] References Cited

U.S. PATENT DOCUMENTS

| | | | |
|---|---|---|---|
| 2,257,531 | 9/1941 | Peebles | 159/13 A |
| 2,624,401 | 1/1953 | Schilt | 159/13 A |
| 2,732,008 | 1/1956 | Seeley | 159/27 A |
| 2,741,303 | 10/1956 | Bergstrom | 159/27 B |
| 3,075,578 | 1/1963 | Sumiya | 159/27 A |

FOREIGN PATENT DOCUMENTS

| | | | |
|---|---|---|---|
| 4,571 | 1910 | United Kingdom | 159/14 |
| 893,633 | 4/1962 | United Kingdom | 159/13 A |

*Primary Examiner*—Norman Yudkoff
*Assistant Examiner*—Martin G. Mullen
*Attorney, Agent, or Firm*—Mandeville and Schweitzer

[57] ABSTRACT

A vertical tube evaporator is disclosed comprised of two sets of tubes, one set forming an upflow zone and the other set forming a downflow zone. The liquid to be treated comprised of fresh feed and a recirculating liquid stream is introduced into the upflow zone at an initial velocity of about 0.5 feet per second based on the cross-section area of the tubes. The vapor-liquid stream withdrawn from the first set is then passed through a distribution plate having orifices aligned with the tubes in the second set and of smaller diameter prior to passage thereof through the second set of tubes. The condition of the vapor-liquid stream between the sets of tubes is visually observed to permit adjustment of initial flow rate to the first set of tubes of the evaporator for optimization of heat transfer coefficients.

3 Claims, 2 Drawing Figures

EVAPORATING APPARATUS AND PROCESS

This is a continuation of application Ser. No. 254,427, filed May 18, 1972 and now abandoned.

BACKGROUND OF THE INVENTION

This invention relates generally to an apparatus and process for the concentration of liquid material containing one or more vaporizable components, and more particularly to vertical-tube evaporators.

In U.S. Pat. No. 2,257,531, there is disclosed vertical-tube type evaporator for concentrating a visous material including a vertical shell having horizontal tube sheets with a plurality of vertically disposed tubes mounted therein. The liquid to be treated is passed upwardly through a plurality of the centrally-disposed tubes and is subsequently passed downwardly through the remaining circumferentially-disposed tubes. While such design has proven effective for the concentration of solutions, the surface of the tubes must be periodically cleaned as a result of fouling, particularly when concentrating solutions containing suspended solids. Additionally, should the rate of liquid material being treated be significantly reduced for short time periods, the rate of fouling is measurably increased, and in certain instances may result in plugged tubes with a concomittant rapid fall-off in capacity. Since minimum flow is emphasized, the top tube sheet is usually machined. Additionally, the configuration of the bottom inlet resulted in costly manufacturing requirements, replete with difficult sealing problems.

OBJECTS OF THE INVENTION

An object of this invention is to provide an improved evaporating apparatus and process for concentrating a liquid containing a vaporizable component.

Another object of this invention is to provide an improved evaporating apparatus and process for concentrating a liquid whereby fouling of evaporating tubes is substantially eliminated.

Still another object of this invention is to provide an improved evaporating apparatus and process for concentrating a liquid whereby high heat transfer coefficients are achieved.

A further object of this invention is provide an improved evaporating apparatus and process for concentrating a liquid wherein the operation thereof may be readily adjusted for optimization of heat transfer coefficients for diverse rates of flow of fresh feed.

A still further object of this invention is to provide an improved evaporating apparatus and process for concentrating heat sensitive liquids without deleteriously effecting the properties thereof, e.g. flavor.

SUMMARY OF THE INVENTION

These and other objects of this invention are achieved by providing a vertical-tube evaporator having an upflow zone and a downflow zone comprised of a plurality of tubes vertically disposed in tube sheets mounted within pressure vessel. In a portion of the vessel below the lower tube sheet, a partition is provided to form an inlet zone and an outlet zone therefor. The portion of vessel above the upper tube sheet is provided with a baffle and distribution assembly, as more fully hereinafter discussed. The top head cover of the vessel is provided with a sight glass to permit observation of the condition of the vapor-liquid stream to correct for recirculation rates as more fully hereinafter described. The outlet zone of the vessel is in fluid communication with a separator wherein vapor is separated from the remaining liquid. A major portion of the liquid is combined with a feed stream, preferably in a ratio of at least about 8 to 1, and is passed to the evaporator with the minor portion thereof being withdrawn as product.

The rate of recirculation is controlled to achieve optimum heat transfer coefficients with film boiling commencing almost immediately upon introduction of the liquid into the upflow zone and continuing for almost the entire length thereof. Vapor generated during passage of the liquid through the upflow zone is utilized to promote a high initial velocity of the liquid into the downflow zone with film boiling throughout the entire length thereof.

BRIEF DESCRIPTION OF THE DRAWINGS

A better understanding of the present invention as well as other objects and advantages thereof will become apparent upon consideration of the detailed disclosure thereof, especially when taken with the accompanying drawings, wherein like numerals designate like parts throughout, and wherein.

DETAILED DESCRIPTION OF THE INVENTION

Figures 1, 2:
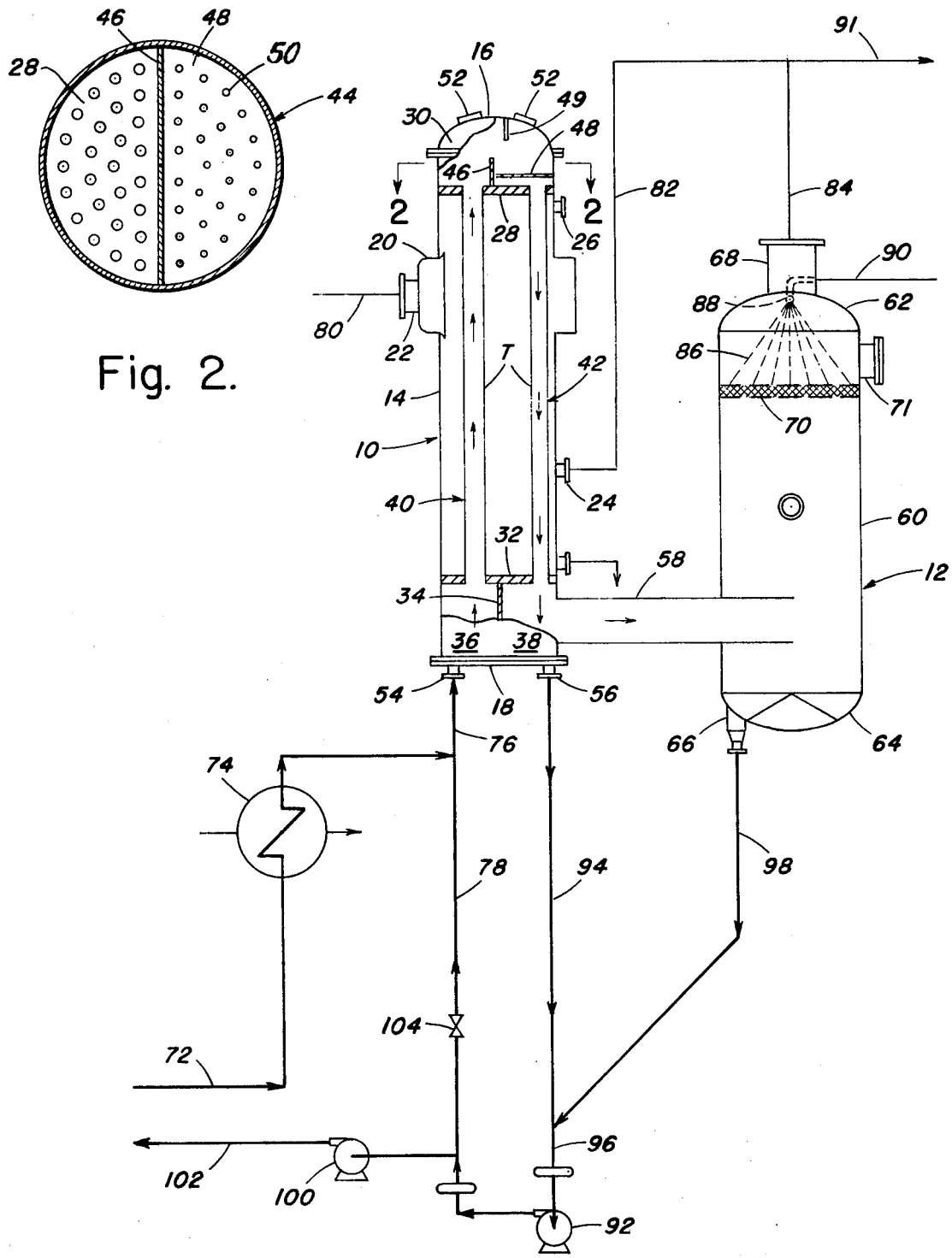
FIG. 1 is a schematic flow diagram illustrating the apparatus and process of the present invention.
FIG. 2 is an enlarged simplified top view taken along the line 2—2 of FIG. 1 and illustrating the baffle and distribution assembly.

Referring now to FIG. 1, there is illustrated a vertical-tube evaporator, generally indicated as 10, and a vapor separator, generally indicated as 12. The evaporator 10 is comprised of a cylindrical shell 14 enclosed by suitable flanged connection at the upper end by a dish-shaped head 16 and at the lower end by a cover plate 18. The shell is formed with a plenum chamber 20 including a conduit connection 22, and is provided with outlet conduit connections 24 and 26. A tube sheet 28 is disposed within the upper portion of the vessel 16 above the conduit connection 27 and forms a return flow zone 30 with the head 16. A tube sheet 32 is mounted within the lower portion of the vessel 14. A vertically extending plate 34 is mounted between the bottom tube sheet 32 and the cover plate 18 and forms an inlet zone 36 and an outlet zone 38.

A plurality of tubes, schematically illustrated as T, are disposed within the vessel 14 in the tube sheets 28 and 32 in a manner known to those skilled in the art. The tubes forming an upflow section of the evaporator 10 are generally designated as 40, whereas the tubes forming the downflow section are generally designated as 42, each section 40 and 42 constituting a sector of the tube configuration when viewed from above. A baffle and distribution assembly, generally indicated as 44, is disposed within the return zone 30 and is comprised of a vertically extending plate 46 mounted to the upper portion of the tube sheet 28 and a horizontally extending plate 48 having a plurality of orifices or holes 50 formed therein mounted to plate 46 and the vessel 14 (See FIG. 2). The holes 50 are preferably in coaxial alignment with the axis of the tubes T of the downflow section 42 and are of smaller diameter (e.g. $\frac{3}{4}$ for $1\frac{1}{2}$ tube) than the tubes of the downflow section 42 to promote a high initial velocity of the liquid into such tubes by the vapor generated in the upflow section. Accordingly, proper selection of tube diameters and lengths for a given duty result in high heat transfer coefficients while avoiding fouling, particularly when treating a solution containing suspended solids. The cover 16 is provided with sight glasses 52 to permit observation of the condition of flow of the liquid and vapors issuing from the upflow zone 40 as well as the condition of flow of such liquid and vapors through the distribution plate 48 into the downflow section 42 to ensure optimum operation of the evaporator 10. The bottom plate 18 is provided with conduit connections 54 and 56. A conduit 58 is mounted to the lower portion of the vessel 14 at the outlet zone 38 to provide fluid communication to the vapor separator 12. As illustrated in FIG. 1, vapor-liquid stream is introduced tangentially into the separator 12 which is generally a preferred method.

The vapor separator 12 is comprised of a vertically-disposed vessel 60 enclosed at bottom ends by dish-shaped covers 62 and 64 having conduit connections 66 and 68, respectively. In the upper portion of the vessel 60, a demister screen 70 is provided to remove entrained liquid from the vapor. A conduit connection 71 is mounted on the vessel 60 above the screen 70.

In operation, a feed in line 72 is passed through a heat exchanger 74 and is combined in line 76 with a recirculating stream in line 78 in a ratio of about 1:8 to 1:20. Since the quantity of the stream in line 78 is substantially greater than the feed in line 72, the feed in line 72, in some instances, need not be preheated. The combined stream in line 76 is passed to the inlet zone 36 from which the stream is caused to pass upwardly through the tubes of the upflow section 40 by the vapor formed therein. A heat transfer medium, such as steam, is introduced by line 80 into the plenum zone 20 of the vessel 14 as the source of heat and is withdrawn through line 82 via conduit connections 24 and 26. It is understood that the temperature and pressure of the heat transfer medium is determined by the material being treated with due regard to heat sensitive suspended solids and the like. For example, with heat sensitive materials requiring low temperatures, the steam pressure is generally below atmospheric. As the liquid is passed through the tubes of the upflow section, vapors are generated with a concomitant concentration of the liquid. As hereinbefore mentioned, liquid film boiling commences shortly upon entry of the liquid into the upflow section 40 with the liquid being carried at a high velocity up the tubes of the upflow section 40.

The combined liquid and vapor stream emerging from the tubes of the section 40 is deflected by the baffle 46 and is caused to pass onto the distribution plate 48 from which the liquid and vapor stream is introduced into the tubes of the downflow section 42. As a result of the vapors generated in the section 40 and the relationship of the orifice size to tube diameter, the initial velocity of the liquid entering the downflow section 42 is sufficiently high to similarly provide thereby a substantially complete film of liquid on the tube surface thereby preventing a "dry wall" condition to exist in the section 42 which condition is responsible for tube fouling. Accordingly, the ratio of recirculated liquid in line 78 to fresh feed in line 72 is controlled to achieve a high initial velocity of the liquid into the heat transfer sections 40 and 42.

Generally, the most effective heat transfer condition exists when the action of the liquid and vapor emerging from the top of the tubes of the upflow section 40 is on a continuous basis, i.e. no pulsation effect is caused by liquid flow not being continuous which occurs whenever insufficient vapor is formed to move the liquid into the downflow section 42. Thus, by sighting through the glass(es) provided in cover 16, the condition of the liquid and vapor in zone 30 may be observed to permit controlling of the quantity of recirculated liquid to fresh feed to match the amount of vapor formed to liquid to optimize the heat transfer operation.

The liquid-vapor stream issuing from the lower portion of the tubes of the downflow section 42 is passed into the outlet zone 38 from which the vapor and a portion of the liquid are withdrawn and passed through conduit 58 to the vapor separator 12. In the separator 12, a vapor stream is separated from the liquid and is withdrawn therefrom by line 84. Prior to withdrawal, the vapor is treated to remove entrained liquid, such as by passage through the screen 70 and by contact with a spray of liquid 86 produced by a spray nozzle 88 provided at the terminal portion of line 90. The vapors in lines 82 and 84 may be combined in line 91 if comprised of like material, e.g. steam. The remaining portion of the liquid in outlet zone 38 is withdrawn by pump 92 via line 94 and is combined in line 96 with the liquid in line 98 separated from the vapor stream in separator 12. A portion of the stream in line 96 is withdrawn by pump 100 as product in line 102 whereas the remaining portion is returned to the evaporator 10 by line 78 under the control of valve 104 as the recirculated stream as hereinabove discussed.

The ratio of the recirculated stream in line 78 to fresh feed in line 72 should be at least about 8:1, generally of from 10:1 about 20:1, to provide an initial flow rate of approximately 0.9, 2.5 and 4.6 GPM for 1, 1½ and 2 inch tube diameters, respectively, for water-like newtonian solutions. Such flow rates vary, of course, with the viscosity of material being treated. Generally, optimum circulation results are achieved when the initial velocity of the liquid stream entering section 40 is in the range of about 0.5 feet per second based on the liquid velocity using the full crosssectional open area of the tube at the beginning of the upflow section 40. For non-newtonian liquids, the flow rates are generally slightly lower as well as with viscous newtonian solutions.

By the present invention, high heat transfer coefficients are achieved for specific tube lengths with viscous materials since the laminar flow of such liquid is frequently interrupted. Additionally, when concentrating solutions containing inorganic salts, it is possible to concentrate to above maximum solubility where salting out occurs (observable) without fouling of the tubes with subsequent addition of diluting liquid to re-dissolve the solids.

The valve 104 is provided in line 78 to control recirculation. Alternatively, when using a positive displacement pump, control may be obtained by varying the speed thereof. Proper circulation is ascertainable by observation of the condition of the vapor-liquid stream in zone 30 by sighting through the glasses 52 as hereinabove discussed.

In accordance with the present invention, diverse materials may be concentrated including non-newtonian solutions, such as, caprolactam solutions, tomato solids-type of suspensions and protein hydrolysates. Viscous materials having a viscosity of up to 10,000 centipose are effectively concentrated. Addtionally, heat sensitive materials, e.g. fruit juices, corn syrups and antibiotic solutions have been effectively concentrated since only a small retention volume is required to maintain proper pumping operation. Further, temperature loss due to a hydrostatic heat effect is minimized.

Another important aspect of the present invention is the ability to vary substantially the feed rate (turndown feed rate) without fouling of the tubes. It is understood that tube diameters and numbers of the upflow and downflow sections are selected to provide for correct velocity throughout the evaporator. Pumping costs are substantially reduced as compared to forced circulation evaporators permitting the handling of higher concentration of suspended solids solution. It will be additionally understood that while the above description relates to a single evaporator, that a plurality of such evaporators may be disposed in a multiple effect arrangement, such as disclosed in the aforementioned Pebbles' Letters Patent.

It will be understood that additional valving and piping configurations are provided consistent with accepted practices in the art. While the invention has been described in connection with a single embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A process for concentrating liquids by passing said liquids through a concentration zone defined by a plurality of upflow passageways and down-flow passageways, with said passages being in direct heat exchange relation with a source of heat, characterized by the steps of
   a. passing the fresh liquids to be concentrated through said upflow passageways to form a first liquid-vapor phase;
   b. withdrawing in a first withdrawing step said first liquid-vapor phase from the upper ends of said upflow passageways;
   c. introducing said first liquid-vapor phase into the upper ends of said down-flow passageways;
   d. said introducing step being carried out by passing said first liquid-vapor phase through orifices coaxial with said down-flow passageways;
   e. said orifices being smaller in diameter than their related down-flow passageways;
   f. withdrawing in a second withdrawing step a second liquid-vapor phase from the lower ends of said down-flow passageways;
   g. separating said second liquid-vapor phase into a vapor phase and a liquid phase;
   h. withdrawing a portion of said liquid phase as product;
   i. recirculating the remainder of said liquid phase to said upflow passageways along with said fresh liquids;
   j. visually monitoring said first withdrawing step to avoid pulsations in said first liquid-vapor phase; and
   k. adjusting the rate of recirculation of said liquid phase from said separated second liquid-vapor phase in accordance with said monitoring step so as to maintain a continuous film on the surface of said down-flow passageways.

2. The process as recited in claim 1, further characterized by
   a. the ratio of fresh liquids to recirculated liquid phase introduced into said upflow passages being in the range of between about 1:8 and 1:20.

3. In an evaporator apparatus for concentrating liquids comprising
   a. a vertical tubular shell with a top plate and a bottom plate;
   b. an upper tube sheet in said shell spaced from said top plate to define a return flow zone;
   c. a lower tube sheet in said shell spaced from said bottom plate;
   d. a vertical plate extending between said lower tube sheet and said bottom plate to define an entrance zone and an exit zone;
   e. a plurality of upflow tubes extending between said upper and lower tube sheets, said upflow tubes being in flow communication with said entrance zone and said return flow zone;
   f. a plurality of down-flow tubes extending between said upper and lower tube sheets, said down-flow tubes being in flow communication with said exit zone and said return flow zone;
   g. an inlet and an outlet in said shell between said tube sheets for introducing and withdrawing a heat exchange medium around said upflow and said down-flow tubes; the improvement characterized by
   h. means providing external flow communication between said exit zone and said entrance zone;
   i. separating means in said flow communication means for separating a vapor phase from a liquid-vapor phase withdrawn from said exit zone;
   j. pump means in said flow communication means for moving said liquid phase from said separating means to said entrance zone;
   k. product outlet means in said flow communication means;
   l. sight means in said return flow zone for monitoring pulsations in the liquid-vapor flow therethrough;
   m. whereby said pump means may be adjusted in accordance with said monitoring means so as to maintain to a continuous film on the surface of said down-flow tubes;
   n. a vertical separator plate disposed in said return flow zone extending from said top tube sheet to a point spaced from said top plate, said separator plate separating the orifices of said upflow tubes in said top tube sheet from the orifices of said down-flow tubes;
   o. a horizontal plate extending between said separator plate and said shell in the down-flow section of said return flow zone;
   p. a plurality of orifices in said horizontal plate;
   q. each said orifice being coaxial with a down-flow tube; and
   r. each said orifice being smaller in diameter than said down-flow tubes.

* * * * *